United States Patent
Linton

(10) Patent No.: US 10,385,951 B2
(45) Date of Patent: Aug. 20, 2019

(54) ELECTRIC AXLE ASSEMBLY

(71) Applicant: Schaeffler Technologies AG & Co. KG, Herzogenaurach (DE)

(72) Inventor: Daniel Linton, North Canton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 73 days.

(21) Appl. No.: 15/724,635

(22) Filed: Oct. 4, 2017

(65) Prior Publication Data

US 2019/0101200 A1  Apr. 4, 2019

(51) Int. Cl.

| | |
|---|---|
| *F16H 48/10* | (2012.01) |
| *F16H 37/08* | (2006.01) |
| *B60K 17/16* | (2006.01) |
| *B60K 17/08* | (2006.01) |
| *B60K 17/04* | (2006.01) |
| *B60K 7/00* | (2006.01) |
| *B60W 10/08* | (2006.01) |
| *B60W 10/107* | (2012.01) |
| *B60W 30/18* | (2012.01) |
| *F16H 37/02* | (2006.01) |
| *F16H 48/36* | (2012.01) |

(52) U.S. Cl.
CPC ....... *F16H 37/0813* (2013.01); *B60K 7/0007* (2013.01); *B60K 17/043* (2013.01); *B60K 17/08* (2013.01); *B60K 17/16* (2013.01); *B60W 10/08* (2013.01); *B60W 10/107* (2013.01); *B60W 30/18* (2013.01); *F16H 37/021* (2013.01); *F16H 48/10* (2013.01); *B60K 2007/0038* (2013.01); *B60K 2007/0092* (2013.01); *B60W 2710/081* (2013.01); *B60W 2710/1005* (2013.01); *F16H 2048/106* (2013.01); *F16H 2048/362* (2013.01)

(58) Field of Classification Search
CPC .. F16H 2048/362; F16H 48/10; F16H 37/021; F16H 2048/106; B60K 14/043; B60K 7/0007; B60K 2007/0092; B60K 2007/0038; B60W 10/107; B60W 10/08
USPC ................. 475/150, 208, 219, 339
See application file for complete search history.

(56) References Cited

U.S. PATENT DOCUMENTS

| | | |
|---|---|---|
| 2,018,188 A | 10/1935 | Padgett et al. |
| 2,187,843 A | 1/1940 | Rzeppa |
| 4,882,524 A | 11/1989 | Lee |
| 5,183,444 A * | 2/1993 | Robbins ................ F16H 37/022 475/198 |

(Continued)

FOREIGN PATENT DOCUMENTS

EP  3032717 A1  6/2016

*Primary Examiner* — Roger L Pang
(74) *Attorney, Agent, or Firm* — Volpe and Koenig, P.C.

(57) ABSTRACT

An electric axle assembly is disclosed. The electric axle assembly includes a common housing with an electric motor, a continuously variable transmission, and a planetary differential. The electric motor includes an output shaft and the continuously variable transmission is connected to the output shaft. The continuously variable transmission includes a drive shaft configured to be variably driven by the output shaft. The planetary differential is connected to the drive shaft, and the planetary differential includes a carrier configured to be driven by the drive shaft and dual sun gears configured to be driven by the carrier. Wheel axles are in independent driving engagement with a respective one of the dual sun gears.

16 Claims, 1 Drawing Sheet

(56) References Cited

U.S. PATENT DOCUMENTS

| | | | |
|---|---|---|---|
| 5,292,290 A * | 3/1994 | Scholz | B60K 17/08 |
| | | | 192/53.34 |
| 5,521,819 A | 5/1996 | Greenwood | |
| 5,860,888 A | 1/1999 | Lee | |
| 5,979,257 A | 11/1999 | Lawrie | |
| 6,059,684 A * | 5/2000 | Sasaki | F16H 57/028 |
| | | | 180/65.6 |
| 7,217,205 B2 | 5/2007 | Frank | |
| 7,233,090 B2 | 6/2007 | Evans et al. | |
| 8,998,765 B2 * | 4/2015 | Sten | F16H 48/36 |
| | | | 475/205 |
| 9,083,226 B2 | 7/2015 | Li et al. | |
| 9,267,592 B2 | 2/2016 | Martini et al. | |
| 9,638,292 B1 | 5/2017 | Linton | |
| 9,834,193 B2 * | 12/2017 | Komuro | B60W 10/02 |
| 2005/0006967 A1 | 1/2005 | Bologna | |
| 2007/0087889 A1 * | 4/2007 | Rosemeier | B60K 17/344 |
| | | | 475/205 |
| 2009/0197727 A1 | 8/2009 | Janson | |
| 2010/0317484 A1 | 12/2010 | Gillingham et al. | |
| 2013/0085634 A1 * | 4/2013 | Jinbo | B60W 10/02 |
| | | | 701/22 |
| 2014/0062229 A1 | 3/2014 | Smetana | |
| 2014/0066247 A1 | 3/2014 | Smetana et al. | |
| 2017/0159777 A1 | 6/2017 | Cheng et al. | |
| 2017/0334445 A1 * | 11/2017 | Yahagi | B60W 20/30 |

* cited by examiner

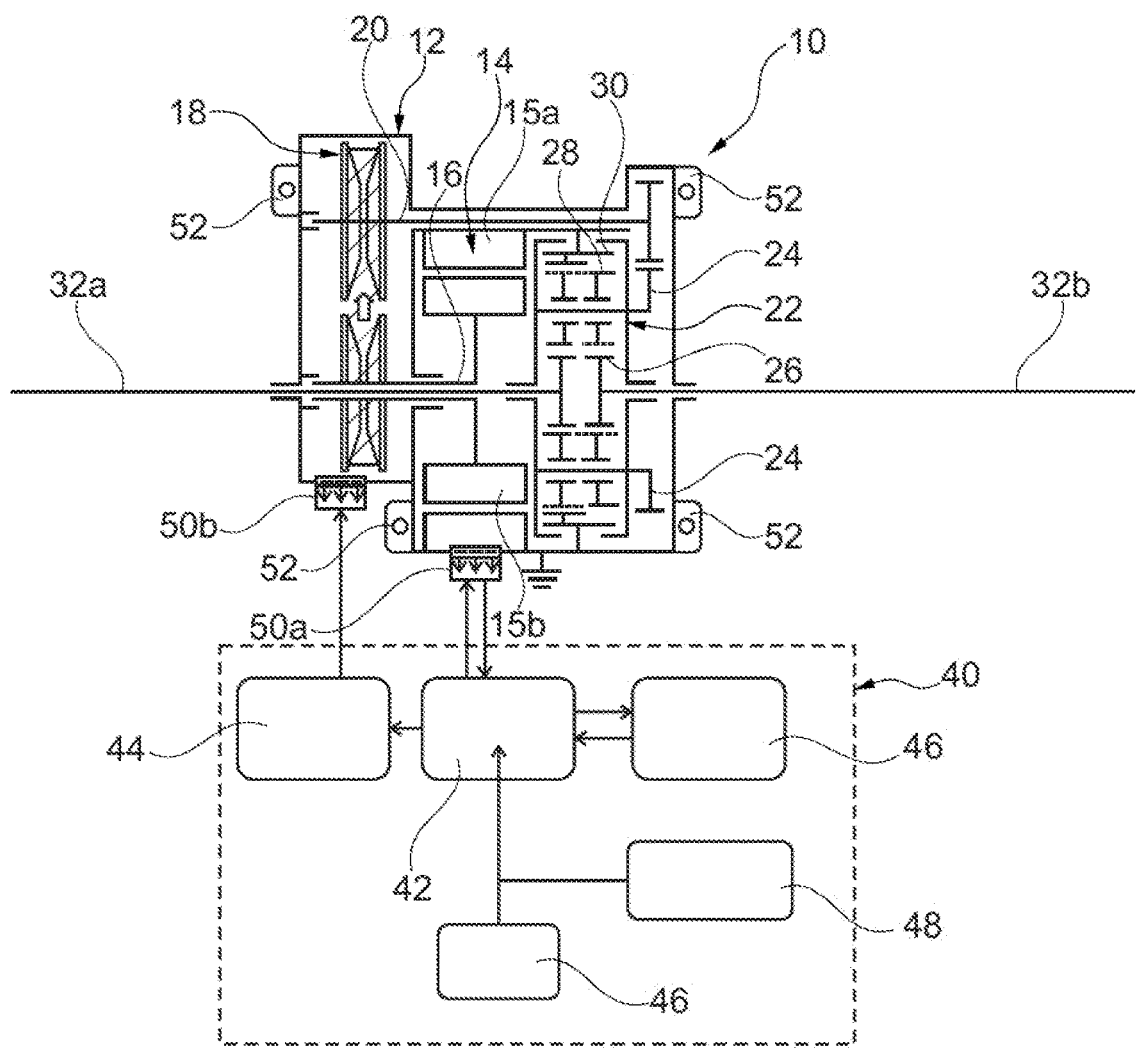

ELECTRIC AXLE ASSEMBLY

FIELD OF INVENTION

This invention is generally related to an electric axle assembly.

BACKGROUND

Drive axle assemblies are well known, for example as disclosed U.S. Pat. Nos. 2,018,188, 2,187,843, and U.S. Pub. 2005/0006967. Electric axle assemblies, i.e. drive axle assemblies including an electric motor that either directly or indirectly drives wheel axles, are also well known. Known electric motor configurations are disclosed in U.S. Pat. Nos. 4,882,524, 7,233,090, and 9,083,226, and EP Pub. 3032717. Known electric axle assemblies can have a direct drive configuration such that the electric motor directly drives the wheel axles. These direct connection arrangements suffer from reduced efficiency as speed increases due to the electric motor drawing higher current while running at a higher rpm.

Planetary differentials and continuously variable transmissions are known components of drivetrains Electric axle assemblies that incorporate differential units and/or continuously variable transmissions are typically heavy and bulky. These arrangements are difficult to implement in electric axle assemblies due to the general need to reduce the weight and space required by electric axle assemblies. Other known electric axle assemblies that incorporate a continuously variable transmission typically require a clutch device, which increases the complexity of the overall assembly, as well as weight.

It would be desirable to provide a compact and efficient electric axle assembly.

SUMMARY

Briefly stated, an electric axle assembly including a common housing having an electric motor, a continuously variable transmission, and a planetary differential arranged within the common housing is disclosed. The electric motor includes an output shaft and the continuously variable transmission is connected to the output shaft. The continuously variable transmission includes a drive shaft configured to be variably driven by the output shaft. The drive shaft from the continuously variable transmission is connected to the planetary differential by driving the planetary gear carrier. The planetary differential's planetary gears are in dual sets and drive dual sun gears, which drive axles in turn drive the wheels and tires. The electric axle assembly includes a first wheel axle and a second wheel axle, which are each in independent driving engagement with respect to one of the dual sun gears.

Preferred arrangements with one or more features of the invention are described below and in the claims.

BRIEF DESCRIPTION OF THE DRAWING

The foregoing summary as well as the following detailed description will be best understood when read in conjunction with the appended drawing. In the drawing:

FIG. 1 is schematic diagram of an electric axle assembly according to an embodiment.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIG. 1, an electric axle assembly 10 is illustrated. The electric axle assembly 10 includes a common housing 12. An electric motor 14, a continuously variable transmission 18, and a planetary differential 22 are provided within the common housing 12. A control assembly 40 is also provided in communication with the electric axle assembly 10.

The electric motor 14 includes an output shaft 16, a stator 15a, and a rotor 15b. The rotor 15b is connected to the output shaft 16. In one embodiment, the electric motor 14 is a brushless induction motor. In one embodiment, the electric motor 14 is an integrated permanent magnet motor. One of ordinary skill in the art would recognize that alternative types of motors can be used, such as disclosed in U.S. Pat. Nos. 4,882,524, 7,233,090, and 9,083,226, and EP Pub. 3032717, all of which are incorporated by reference as if fully set forth herein. The electric axle assembly 10 requires a single electric motor 14 and a single associated controller (described in more detail below) for controlling the single electric motor 14, and the single electric motor 14 provides all of the requisite torque for one set of axles of the associated vehicle, which can use one or more electric axles in total.

The continuously variable transmission 18 is connected to the electric motor's output shaft 16. The continuously variable transmission 18 includes a drive shaft 20 configured to be driven by the variable ratios of the two V-pulleys typically connected by a V-belt, which is driven by the output shaft 16 of the electric motor 14. In one embodiment, the continuously variable transmission 18 is a conical type transmission including a dual pulley-belt assembly for variably transmitting torque from the output shaft 16 to the drive shaft 20. One of ordinary skill in the art would recognize from the present disclosure that alternative types of continuously variable transmissions can be used in the electric axle assembly 10. Examples of continuously variable transmissions are disclosed in U.S. Pub. 2017/0159777, and U.S. Pat. Nos. 5,521,819, 5,860,888, and 7,217,205, all of which are incorporated by reference as if fully set forth herein. A ratio of the continuously variable transmission 18 is controlled by a controller, which is described in more detail below. One of ordinary skill in the art would recognize that the continuously variable transmission 18 can be controlled by any known type of control system, e.g., an electrical control unit, mechanical control unit, or hydraulic control unit, etc. The ratio of the continuously variable transmission 18 is varied to maximize efficiency of the electric motor 14 and improve range.

The planetary differential 22 is connected to the drive shaft 20. The planetary differential 22 includes a carrier 24 configured to be driven by the drive shaft 20. The planetary differential 22 includes dual sun gears 26 configured to be driven by the planetary gear sets 28 attached to the carrier 24. The planetary differential 22 includes planetary gears 28 in driving engagement with the dual sun gears 26. The planetary differential 22 includes an outer ring 30 fixed to the housing 12. One of ordinary skill in the art would recognize from the present disclosure that alternative types of planetary differentials with varying configurations of gears can be integrated into the electric axle assembly 10. Examples of known planetary differentials are disclosed in U.S. Pat. Nos. 9,267,592 and 9,638,292, which are both incorporated by reference as if fully set forth herein. The electric axle assembly 10 includes a first wheel axle 32a and a second wheel axle 32b, and each of the wheel axles 32a, 32b are connected to a respective wheel and tire to transmit torque from the electric motor 14 to the tires. Each of the wheel axles 32a, 32b are in independent driving engagement with a respective one of the dual sun gears 26. The planetary differential 22 provides a compact differential arrangement for transferring torque between (1) the electric motor 14 and the continuously variable transmission 18, and (2) the wheel axles 32a, 32b.

As shown in FIG. 1, the electric axle assembly 10 includes a control assembly 40. The control assembly 40 provides inputs for controlling components within the housing 12. The control assembly 40 includes a first controller 42 configured to control the electric motor 14, a second controller 44 configured to control the continuously variable transmission 18, and a power supply unit 46 configured to provide power to the first controller 42 and the second controller 44. The first controller 40 is configured to control a speed and direction of the electric motor 14. One of ordinary skill in the art would recognize from the present disclosure that the first controller 40 can be used to control other functions of the electric motor 14. The second controller 44 is configured to control a ratio of the continuously variable transmission 18. One of ordinary skill in the art would recognize from the present disclosure that the second controller 44 can be used to control other functions of the continuously variable transmission 18. A step down voltage regulator (not shown) can be included in the control assembly 40 for providing appropriate voltage to operate the controllers 42, 44. A step down voltage regulator can alternately be integrated into the first controller 42. The second controller 44 can be controlled via programming from the first controller 42. One of ordinary skill in the art would recognize from the present disclosure that the power supply unit 46 can be a DC power supply battery, capacitor, or any other type of power supply unit.

A primary input device 46 is configured to provide input signals to the control assembly 40. In one embodiment, the primary input device 46 is configured to receive input from a throttle. As shown in FIG. 1, the control assembly 40 can include an auxiliary input device 48 configured to provide additional input signals to the control assembly 40. The auxiliary input device 48 can be configured to receive input signals from other known vehicle input systems, such as passive cruise control, automatic emergency braking, traction and vehicle slip control, etc. The primary input device 46 and the auxiliary input device 48 can be any known type of controller or control unit, processor, CPU, potentiometer, or any electronic signaling device capable of providing command signals for controlling the associated components of the electric axle assembly 10.

The housing 12 includes a first electrical connection 50a configured to be connected to the first controller 42 and a second electrical connection 50b configured to be connected to the second controller 44. As shown in FIG. 1, the housing 12 provides a compact configuration that provides a common enclosure for the electric motor 14, the continuously variable transmission 18, and the planetary differential 22, while also providing electrical connections 50a, 50b for the control assembly 40. FIG. 1 illustrates two separate electrical connections 50a, 50b, but one of ordinary skill in the art would recognize from the present disclosure that a single electrical connection could be provided.

The embodiments disclosed herein provide a single compact housing 12 that includes (1) the three primary components (i.e. electric motor 14, continuously variable transmission 18, and planetary differential 22) of the electric axle assembly 10, (2) electrical connections 50a, 50b for providing electrical power and controlling signals to the electric motor 14 and the continuously variable transmission 18, and (3) mounting tabs 52 for mounting the electric axle assembly 10 in a vehicle. This arrangement reduces the overall size of the assembly compared to known electric axle assemblies and also provides a simplified integration arrangement for interfacing with the control assembly 40. Although four mounting tabs 52 are illustrated in FIG. 1, one of ordinary skill in the art would understand from the present disclosure that any number of mounting tabs 52 can be provided.

The controllers 42, 44 are also configured to regulate the amount of regenerative power for the electric motor 14 can return back to the power supply unit 46. The amount of regenerative power generated by the electric motor 14 can be manually adjusted via the inputs 46, 48, or can be automatically adjusted according to pre-programmed software modes. In one embodiment, a user can select the amount of work demanded of the electric motor 14 in a coasting mode or braking mode, during which power is returned to the power supply unit 46.

Having thus described various embodiments of the present electric axle assembly in detail, it is to be appreciated and will be apparent to those skilled in the art that many changes, only a few of which are exemplified in the detailed description above, could be made in the electric axle assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS electric axle assembly 10
housing 12
electric motor 14
stator 15a
rotor 15b
output shaft 16
continuously variable transmission 18
drive shaft 20
planetary differential 22
carrier 24
sun gears 26
planetary gears 28
outer ring 30
wheel axles 32a, 32b
control assembly 40
first controller 42
second controller 44
power supply unit 46
primary input device 46
auxiliary input device 48
electrical connections 50a, 50b
mounting tabs 52

What is claimed is:

1. An electric axle assembly comprising:
a housing;
an electric motor including an output shaft;
a continuously variable transmission connected to the output shaft, the continuously variable transmission including a drive shaft configured to be variably driven by the output shaft;
a planetary differential connected to the drive shaft, the planetary differential including a carrier configured to be driven by the drive shaft, and dual sun gears configured to be driven by the carrier, the planetary differential includes an outer ring that is fixed on the housing and the housing includes mounting tabs; and
a first wheel axle and a second wheel axle, each said wheel axle in independent driving engagement with a respective one of the dual sun gears, wherein the electric motor, the continuously variable transmission, and the planetary differential are arranged within the housing.

2. The electric axle assembly of claim 1, further comprising:
a control assembly including a first controller configured to control the electric motor; a second controller configured to control the continuously variable transmission; and a power supply unit configured to provide power to the first controller and the second controller; and
a primary input device configured to provide input signals to the control assembly.

3. The electric axle assembly of claim 2, further comprising an auxiliary input device configured to provide additional input signals to the control assembly.

4. The electric axle assembly of claim 2, wherein the first controller is configured to control a speed and direction of the electric motor.

5. The electric axle assembly of claim 2, wherein the second controller is configured to control a ratio of the continuously variable transmission.

6. The electric axle assembly of claim 2, wherein the housing includes a first electrical connection configured to be connected to the first controller and a second electrical connection configured to be connected to the second controller.

7. The electric axle assembly of claim 1, wherein the continuously variable transmission includes a dual pulley-belt assembly for variably transmitting torque from the output shaft to the drive shaft.

8. The electric axle assembly of claim 1, wherein the electric motor is a brushless motor.

9. An electric axle assembly comprising:
a housing;
an electric motor including an output shaft;
a continuously variable transmission connected to the output shaft, the continuously variable transmission including a drive shaft configured to be variably driven by the output shaft;
a planetary differential connected to the drive shaft, the planetary differential including a carrier configured to be driven by the drive shaft, and dual sun gears configured to be driven by the carrier;
a first wheel axle and a second wheel axle, each said wheel axle in independent driving engagement with a respective one of the dual sun gears, wherein the electric motor, the continuously variable transmission, and the planetary differential are arranged within the housing;
a control assembly including a first controller configured to control the electric motor, a second controller configured to control the continuously variable transmission, and a power supply unit configured to provide power to the first controller and the second controller; and
a primary input device configured to provide input signals to the control assembly,
the electric motor being positioned axially between the planetary differential and the continuously variable transmission.

10. The electric axle assembly of claim 9, further comprising an auxiliary input device configured to provide additional input signals to the control assembly.

11. The electric axle assembly of claim 9, wherein the first controller is configured to control a speed and direction of the electric motor.

12. The electric axle assembly of claim 9, wherein the second controller is configured to control a ratio of the continuously variable transmission.

13. The electric axle assembly of claim 9, wherein the housing includes a first electrical connection configured to be connected to the first controller and a second electrical connection configured to be connected to the second controller.

14. The electric axle assembly of claim 9, wherein the continuously variable transmission includes a dual pulley-belt assembly for variably transmitting torque from the output shaft to the drive shaft.

15. The electric axle assembly of claim 9, wherein the electric motor is a brushless motor.

16. The electric axle assembly of claim 9, wherein the planetary differential includes an outer ring that is fixed on the housing and the housing includes mounting tabs.

* * * * *